United States Patent
Ozegovic

(10) Patent No.: US 7,027,401 B1
(45) Date of Patent: Apr. 11, 2006

(54) DEVICES WITH WINDOW-TIME-SPACE FLOW CONTROL (WTFC)

(75) Inventor: Julije Ozegovic, Istarska 2, Split (HR) 21000

(73) Assignee: Julije Ozegović, Split (HR)

( * ) Notice: Subject to any disclaimer, the term of this patent is extended or adjusted under 35 U.S.C. 154(b) by 0 days.

(21) Appl. No.: 09/787,002

(22) PCT Filed: Sep. 29, 1999

(86) PCT No.: PCT/HR99/00022

§ 371 (c)(1),
(2), (4) Date: Mar. 12, 2001

(87) PCT Pub. No.: WO00/21244

PCT Pub. Date: Apr. 13, 2000

(30) Foreign Application Priority Data

Oct. 5, 1998 (HR) ................................ P 980536 A

(51) Int. Cl.
| | |
|---|---|
| G01R 31/08 | (2006.01) |
| G06F 11/00 | (2006.01) |
| G08C 15/00 | (2006.01) |
| H04J 1/16 | (2006.01) |
| H04J 3/14 | (2006.01) |

(52) U.S. Cl. ...................... 370/236; 370/250
(58) Field of Classification Search ........ 370/231–235, 370/253, 252, 236, 229, 230, 241, 249, 250, 370/465
See application file for complete search history.

(56) References Cited

U.S. PATENT DOCUMENTS

| | | | | |
|---|---|---|---|---|
| 4,475,192 A | * | 10/1984 | Fernow et al. .............. | 370/232 |
| 5,163,046 A | * | 11/1992 | Hahne et al. ............... | 370/237 |
| 5,193,151 A | * | 3/1993 | Jain ........................... | 709/237 |
| 5,367,523 A | * | 11/1994 | Chang et al. ............... | 370/235 |
| 5,617,409 A | * | 4/1997 | Ozveren et al. ............ | 370/235 |
| 6,208,653 B1 | * | 3/2001 | Ogawa et al. ......... | 370/395.52 |

OTHER PUBLICATIONS

Cui-Qing Yang; Reddy, A.V.S., A taxonomy for congestion control algorithms in packet switching networks, Networks, IEEE, vol. 9, Iss.4, Jul./Aug. 1995, pp.:34–45.*

(Continued)

*Primary Examiner*—Dang Ton
*Assistant Examiner*—Kevin C. Harper

(57) ABSTRACT

In packet switching telecommunications networks, flow control is used to obtain optimal network working point, regulating the transmitter packet sending rate. The state of overload (congestion) or underutilization of the network can be detected explicitly using signalling from network nodes, or implicitly using number of packet (window W) and round trip time (T) measurements.

The Window-Time-Space Flow Control, WTFC is a method of determining the belonging part of network capacity, optimal packet sending rate and optimal window, based on the measured W,T point in the window-time space and knowledge about total network capacity $W_0, T_0$. In this way, devices with WTFC, nodes and terminals, keep optimal network working point near the on average empty queues mode of operation.

With networks utilizing WTFC, nodes can signal network parameters at connection establishment only. After that, all WTFC processing is done by terminal packet transmitter. WTFC transmitter determines both optimal window and optimal sending rate, thus improving regulation stability, limiting the number of packets in the network, and decreasing the variance of transmission rate.

14 Claims, 4 Drawing Sheets

OTHER PUBLICATIONS

J. Ozegovic: "Window-time-space flow control (WTFC)" Proceedings 7th ICCCN Oct. 12-15, 1998, pp 800-807, Lafayette, LA, USA.

J.Ozegovic: "Implementation algorithms for the Window-time-space flow control (WTFC)", Proceedings 8th ICCCN Oct. 11-13, 1999, pp. 30-35, Boston, MA, USA.

* cited by examiner

ARRIVAL PROCESS $t_k, \bar{t}, \tau^2$     SERVER PROCESS $s_k, \bar{s}, \sigma^2$ QUEUE $W_q, T_q$     SERVER $W_S, T_S$     COMMUNICATION CHANNEL $W_p, T_p$

DEVICES WITH WINDOW-TIME-SPACE FLOW CONTROL (WTFC)

CROSS REFERENCE TO THE RELATED APPLICATIONS

P980536A, Croatia, filled 05. Oct. 1998.
PCT/HR99/00022, filled 29. Sep. 1999.

STATEMENT REGARDING FEDERALLY SPONSORED RESEARCH OR DEVELOPMENT

Not applicable

INCORPORATION BY REFERENCE OF MATERIAL SUBMITTED ON A COMPACT DISC AND REFERENCE TO A MICROFICHE APPENDIX

Not applicable

BACKGROUND OF THE INVENTION

This invention concerns devices with data flow control, used in packet switched telecommunications networks. According the international classification (MKP) it is classified as: H 04 L 12/56-SECTION H-ELECTRICITY, TRANSMISSION OF DIGITAL INFORMATION, Data switching networks, packet switching systems.

DESCRIPTION OF RELATED ART

Modern telecommunications networks use advances of information statistical multiplexing, achieved with packet switching, despite packet length is variable up to some limit (Internet) or fixed (ATM), and despite packets are forwarded individually or using virtual channels. Users segment their data to packets in terminal equipment and send them to the network, while network nodes route packets to their destinations.

In case when, in the time of observation, a network node receives less packets than the capacity of output channels used to forward those packets, the network is underutilized. In case when more packets are received, some of them will be transferred up to the full capacity of output channels, and the rest will be buffered in node's memory. The network is overloaded, and congestion has occurred. Because of packet buffering, the average packet must wait for transmission of the previous packets, and its waiting time is prolonged.

Statistical properties of incoming traffic (packet network terminals send packets at arbitrary moments) influence occasional congestion and network underutilization. To provide quality of service (QoS) it is necessary to minimize the number of packets in node's queues, but to the level that will provide satisfactory network utilization. This is optimal network working point, kept by congestion control measures, including congestion avoidance when congestion is not apparent, and congestion elimination, after for some reason congestion has occurred. The most important congestion avoidance measure is flow control.

The flow control in packet networks is achieved by packet sending rate regulation in network terminals. In case of network underutilization, terminals should increase, otherwise, in case of congestion, they should decrease packet sending rate.

The flow control problem is apparent for last ten years, and a number of investigators work on it worldwide. Despite numerous scientific papers and granted patents, the very fact, that old unsatisfactory solutions from 1988. are used in the Internet nowadays, shows that right solution of the flow control problem has not been discovered yet.

The basic mechanism of congestion occurrence is packet buffering in node memory. Packets are stored to queues, waiting to be transferred through channels. Prolonged packet waiting time is a consequence of packet buffering. The time packet spends on it's route from source to destination, and similar time acknowledgment spends in backward direction, are together called Round Trip Time (RTT, or simply T), and its prolongation because of waiting we consider to be basic quality of service measure in packet switching networks.

The flow control solution is searched using two approaches. In the first approach, network nodes do not provide data about network state, but rather store excessive packets in memories, or discard remaining packets when memories are full. Terminals of such networks measure round trip time T, window W (the number of their own packets on the network) and packet losses, and try to adjust their packet sending rate. In the second approach, network nodes provide data about network state implicitly (e.g. enforcing waiting time or packet loss rate) or explicitly (e.g. sending forward or backward congestion indications, or even signaling the optimal sending rate for the data flow). When explicit notification is used, the data processing load in nodes can be very large, prohibiting the use of some recently proposed solutions. In all cases, except when optimal rate is explicitly signaled, packet transmitter defines new optimal rate using embedded transmitter algorithms (linear increase and exponential decrease of rate are most frequently used). Further systematization and references can be found in: C-Q Yang, A. V. Reddy, "A Taxonomy for congestion Control Algorithms in packet Switching Networks" IEEE Network Vol. 9. No. 5. July 1995.

DETAILED DESCRIPTION OF THE INVENTION

Regarding present state of the art, the invention solves the problem of optimal packet window and rate calculation in networks with closed loop implicit feedback flow control.

BRIEF SUMMARY OF THE INVENTION

In packet switching telecommunications networks, flow control is used to obtain optimal network working point, regulating the transmitter packet sending rate. The state of overload (congestion) or underutilization of the network can be detected explicitly using signalling from network nodes, or implicitly using number of packet (window W) and round trip time (T) measurements.

The Window-Time-Space Flow Control, WTFC is a method of determining the belonging part of network capacity, optimal packet sending rate and optimal window, based on the measured W,T point in the window-time space and knowledge about total network capacity $W_0, T_0$. In this way, devices with WTFC, nodes and terminals, keep optimal network working point near the on average empty queues mode of operation.

With networks utilizing WTFC, nodes can signal network parameters at connection establishment only. After that, all WTFC processing is done by terminal packet transmitter. WTFC transmitter determines both optimal window and optimal sending rate, thus improving regulation stability, limiting the number of packets in the network, and decreasing the variance of transmission rate.

BRIEF DESCRIPTION OF THE SEVERAL VIEWS OF THE DRAWINGS

FIGS. 1 and 2 present the structure of WTFC devices, and the rest of them are used to illustrate the operation of WTFC algorithms.

FIG. 1. WTFC terminal structure

FIG. 2. WTFC node structure

FIG. 3. Queuing system with one server

FIG. 4. Delay curves and optimal working point for M/M/I, GIG/I and D/D/I models FIG. 5. D/D/I/W model response FIG. 6. Family of delay curves depending on (x FIG. 7. Optimal working point calculation FIG. 8. Constrains in W,T plane FIG. 9. Connection startup algorithm, with packet pair FIG. 10. Packet sending algorithm after first acknowledgment FIG. 11. Window calculation for a) window control and b) combined control

DETAILED DESCRIPTION OF THE INVENTION

The invention in this patent request deals with the solution of the congestion in packet networks by proposing improved flow control method. The novelty of the invention, related to the present state of the technique, is flow control in window-time space, used to achieve optimal packet sending rate and uniform times between packets. This provides high network utilization and high quality of service, while keeping network node processing load at minimal level.

Devices with window-time-space flow control (WTFC) use network model based on the determined single server queuing system and finite number of packets in the network. The total network capacity point ($W_0$, $T_0$) defines window-time plane (or space), which contains network response curves for various fractions of corresponding capacity. Each response curve has a break point, which lie on the hyperbola through ($W_0$, $T_0$). After a point (W,T) is measured, it is possible to determine whether it is positioned above or below the hyperbola, and apply one of formula sets to calculate corresponding capacity fraction and break point coordinates of the response curves. Coordinates of the break point are used to calculate optimal window and delay, and their ratio to obtain optimal packet sending rate.

Nodes can signal the total network capacity ($W_0$, $T_0$) in form of elementary network channel parameters. Using the bottleneck concept, device with WTFC control obtains ($W_0$, $T_0$) point coordinates. Alternatively, ($W_0$, $T_0$) can be estimated from previous measurements.

The Black Box Model of the Network

We observe data communications network as a black box, meaning that network structure is not known to the packet sender (transmitter). Packet sender sends packets to the network and receives acknowledgments. It observes round trip time as an difference between time of the acknowledgment and time of packet emitting, Equation 1:

$$T = t(a_k) - t(p_k) \quad\quad 1$$

In the same time, the window is measured as the difference, at the moment of packet emitting, between packet sequential number and last acknowledgment sequential number, Equation 2:

$$W = p_k - a_j \quad\quad 2$$

The receiver has a role of packet destination and acknowledgment generation.

Figure 3:
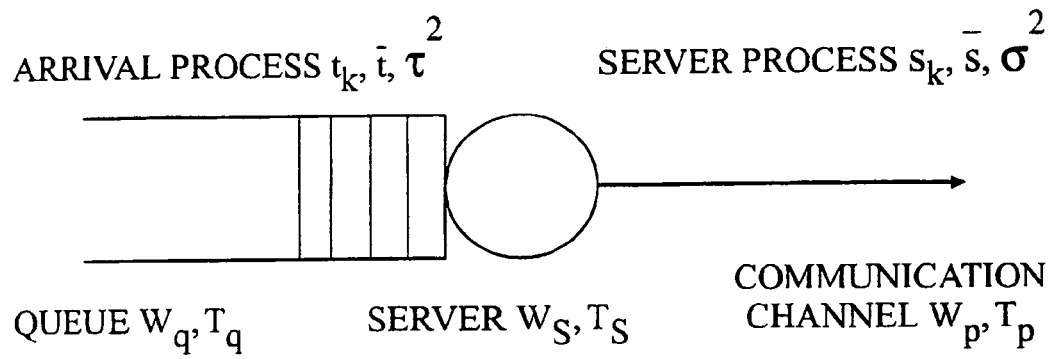

We model a network using single server queuing system, FIG. 3. Regarding the characteristics of telecommunications channel, Equation 3 is valid:

$$T = T_q + T_0 = T_q + T_s + T_p T_0 = T_s + T_p \quad\quad 3$$

where T, total waiting time of the model, is round trip time, $T_q$ is queue waiting time and $T_0$ is total serving time, equals the sum of propagation time $T_p$ (depending on channel length and propagation speed) and transmission time $T_s$ (a time needed to send packet to the channel, depending on packet length and channel capacity). Considering at most one packet in the server, for a single server system we have Equation 4:

$$W = W_q + W_0 = W_q + W_s + W_p W_0 = W_s + W_p = 1 + W_p \quad\quad 4$$

where W is window (total number of packets), $W_q$ is number of packets in the queue and $W_0$ is total number of packets currently served, equals the sum of packets in the server $W_s = 1$ and number of packets in the channel $W_p$. For packet switching networks Equation 5 is valid:

$$T_s = W_s \frac{\overline{M}}{C} \underset{W_s=1}{=} \frac{\overline{M}}{C} = \frac{1}{\mu}$$

$$T_p = W_p \frac{\overline{M}}{C} = W_p \frac{1}{\mu} \Rightarrow W_p = T_p \mu = T_p \frac{C}{\overline{M}} = \frac{T_p}{T_s} \quad\quad 5$$

where C is channel capacity or transmission speed (bits per second), $\overline{M}$ is average length of packets (bits per packet) and $\mu$ is serving rate (packets per second). We also use λ to mark packet arrival rate (packets per second).

Optimal Working Point of the Packet Switching Network

Optimal working point of the packet switching network is determined as a compromise between quality of service (delay) and network utilization, kept to provide economical operation of the network. If a network is modeled using the single server queuing system, FIG. 3, we use response (delay) curves, i.e. delay dependence on network load. M/M/1 model with markov (exponential), G/G/1 model with general, and D/D/1 model with deterministic probability dense functions of packet interarrival and service times, are on our disposal. Deterministic model is a special case of general one when variances are equal to zero. If we sketch approximate delay curves, it is obvious that lowering the variance the G/G/1 curves smoothly transform to D/D/1 one, FIG. 4. The MIM/1 case can be considered the worst one because of relatively high variance.

Optimal working point can be determined using the maximum network power (ratio between throughput and delay) or the quality of service criteria. Using maximum power criteria, FIG. 4, lowering the variance network utilization raises slowly, but with simultaneous increase of quality of service. Using constant quality of service criteria, FIG. 4, lowering the variance network utilization raises fast. Delay curve close to the DID/I one is obtained by lowering the variance for only one order of magnitude.

One can conclude that flow control mechanism, besides adapting the packet sending rate, should provide low variances of packet interarrival times and packet service times. In that case, high network utilization is possible while keeping quality of service constant, and the flow control mechanism can use delay curves close to D/D/1 one.

The Window-Time Space

Figure 4:
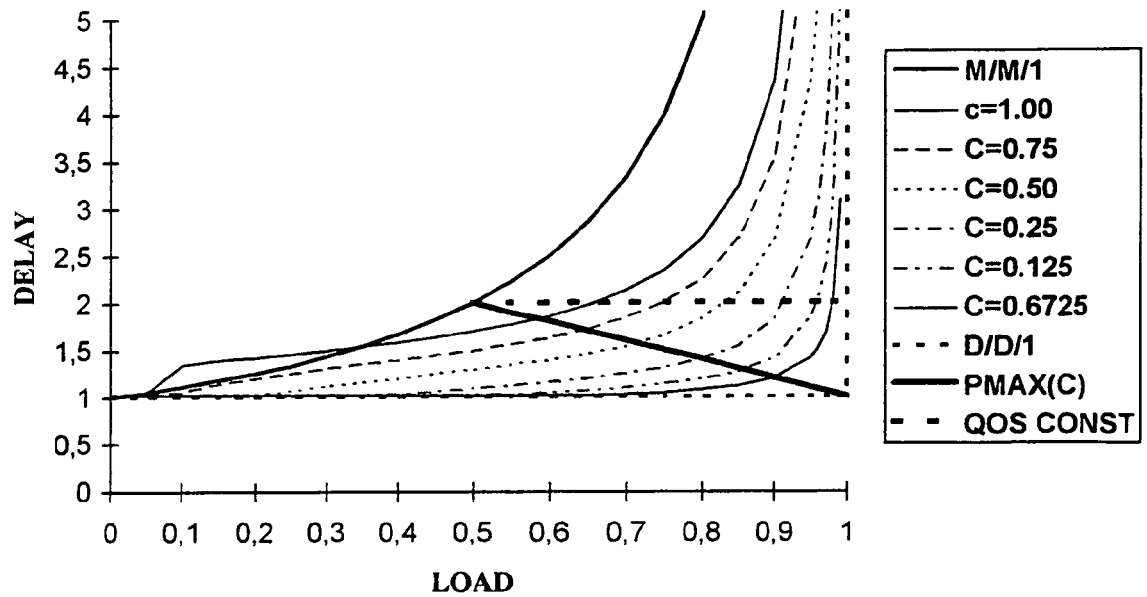

Delay curves on FIG. 4 are sketched for the case of infinite possible number of packets in the network, and all of them have infinite value when network load approaches 100%. In praxis, we can limit the number of packets a transmitter is allowed to send to the network. That number is called maximum window. IF we apply the finite window concept (also called preservation of number of packets in the network) to the deterministic queuing system, we get a D/D/1/W system with delay curve according FIG. 5. The delay function gives a curve with broken in the ($W_0$, $T_0$) point. $W_0$ is optimal window that makes full network utilization possible, and consists of one packet in the server an $W_0-1$ packets in the channel. The curve is defined with Equation 6:

$$T = \begin{cases} T_0 & W \leq W_0 \\ W\dfrac{T_0}{W_0} & W > W_0 \end{cases} \qquad 6$$

Lowering the window, delay time remains constant and equal to $T_0 = T_p + T_s$, i.e. the sum of the propagation and servicing times, Equation 3. The network is underutilized. Increasing the window packets are stored to the queue and linear delay increase, according to the line through origin, occurs. Network is overloaded, but delay time does not raise to infinity because number of packets is limited (finite).

Figure 5:
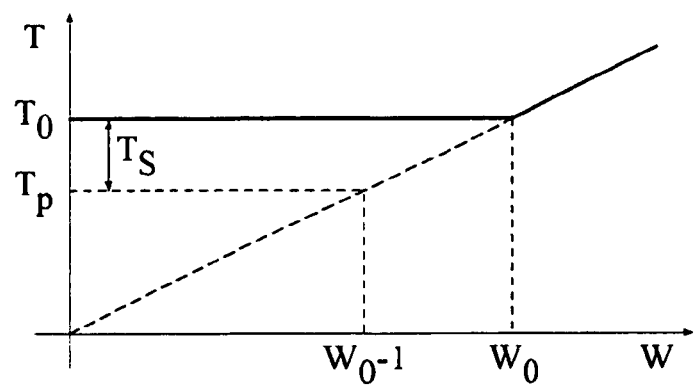

Using Equation 6 and delay curve from FIG. 5, we define window-time space, i.e. W,T plane. Each point of the plane represents a (W,T) pair of window and delay time. If measured (W,T) point is positioned on the curve, FIG. 6, the communications network is presented exactly with this D/D/1/W system. Otherwise, when measured dot is out of the curve, the network parameters have been changed, and new working point should be obtained.

Network Working Point Estimation

If user knows the coordinates of the ($W_0$, $T_0$) point, and consequently the corresponding delay curve, and if he measures the (W,T) point positioned on the delay curve, he can assume that the total network capacity is on his disposal, and that his optimal working point is exactly ($W_0$, $T_0$). In praxis, user shares network capacity with others. We assume that all of them use a little, but equal (fair) portion of the total capacity, Equation 7:

$$\mu_j = \alpha\mu; \alpha \in (0,1) \qquad 7$$

where $\alpha = 1/n$ is a factor dependent on number of users. The sloped part of the curve is defined with Equation 8:

$$T = W\dfrac{1}{\alpha\mu} \text{ or } T = W\dfrac{T_0(\alpha)}{W_0(\alpha)} \qquad 8$$

and consequently, Equation 9:

$$T_0(\alpha) = W_0(\alpha)\dfrac{1}{\alpha\mu}; \lambda = \alpha\mu \qquad 9$$

Considering $T_p$ is independent of $\alpha$, we have Equation 10:

$$T_p = W_p(\alpha)\dfrac{1}{\alpha\mu} \Rightarrow W_p(\alpha) = T_p\alpha\mu \qquad 10$$

and we can calculate delay for the flat part of the delay curve, Equation 11:

$$T_0(\alpha) = W_0(\alpha)\dfrac{1}{\alpha\mu} = (W_p(\alpha)+1)\dfrac{1}{\alpha\mu} \qquad 11$$
$$= W_p(\alpha)\dfrac{1}{\alpha\mu} + \dfrac{1}{\alpha\mu} = T_p + \dfrac{1}{\alpha\mu}$$

The delay curve is determined with Equation 12:

$$T = \begin{cases} T_p + \dfrac{1}{\alpha\mu} & \lambda \leq \alpha\mu \\ W\dfrac{1}{\alpha\mu} & \lambda > \alpha\mu \end{cases} \text{ or } T = \begin{cases} T_0(\alpha) & W \leq W_0(\alpha) \\ W\dfrac{T_0(\alpha)}{W_0(\alpha)} & W > W_0(\alpha) \end{cases} \qquad 12$$

Figure 6:
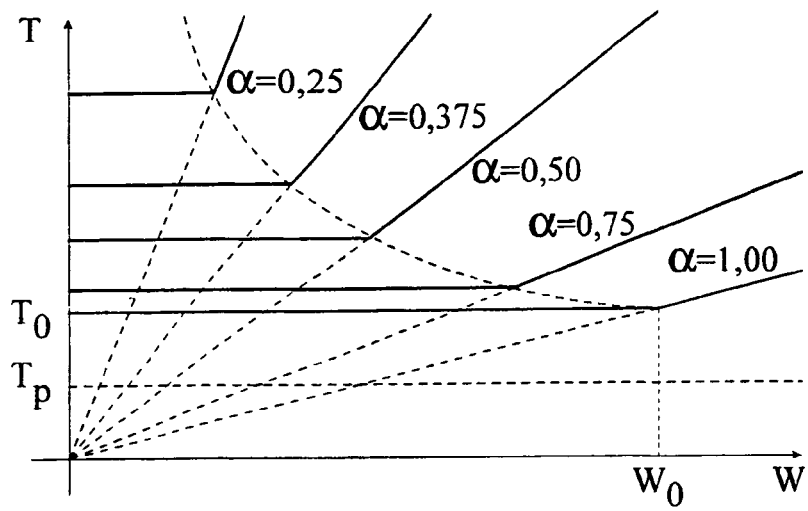

Depending on parameter $\alpha$ we got a family of curves whose break points lie on the hyperbola like curve, FIG. 6.

From the Equation 11 it is obvious that new optimal delay time $T_0(\alpha)$ consists of constant propagation time and transmission (service) time which is increased for several times because other users utilize network capacity. Measuring a (W,T) point in the arbitrary point of the W,T plane, one from the family of delay curves is chosen and explicit calculation of parameter $\alpha$ is enabled. We first check whether the measured (W,T) point is above the hyperbola using two criteria, Equation 13:

$$T \leq T_0(\alpha)$$
$$W \leq W_0(\alpha) \qquad 13$$

or using Equations 9 and 10:

$$T \geq T_p + \dfrac{1}{\alpha\mu} \qquad 14$$

$$W \leq T_p\alpha\mu + 1 \qquad 15$$

Arranging and combining Equations 14 and 15 we get Equation 16:

$$\dfrac{W-1}{T_p} \geq \dfrac{1}{T-T_p} \qquad 16$$

Using the formula for $T_p$, Equation 3, we get Equation 17:

$$T_p = T_0 - T_s = T_0 - \dfrac{1}{\mu} = T_0 - \dfrac{T_0}{W_0} = T_0\dfrac{W_0-1}{W_0} \qquad 17$$

that we use to obtain basic criteria for judging whether point (W,T) lies above or below the hyperbola, Equation 18:

$$\dfrac{W-1}{W_0-1} \geq \dfrac{T_0}{(T-T_0)W_0+T_0} \qquad 18$$

If condition in Equation 18 is fulfilled, the (W,T) point lies above the hyperbola, and parameter a is calculated using Equation 19:

$$T = \frac{W}{\alpha\mu} = \frac{W}{\alpha}\frac{T_0}{W_0} \Rightarrow \alpha = \frac{W}{W_0}\frac{T_0}{T} \qquad 19$$

If condition in Equation 18 is not fulfilled, the (W,T) point lies below the hyperbola, and parameter $\alpha$ is calculated using Equation 20:

$$T = T_0(\alpha) = T_p + \frac{1}{\alpha}\frac{T_0}{W_0} \Rightarrow \alpha = \frac{T_0}{W_0(T-T_0)+T_0} \qquad 20$$

Figure 7:
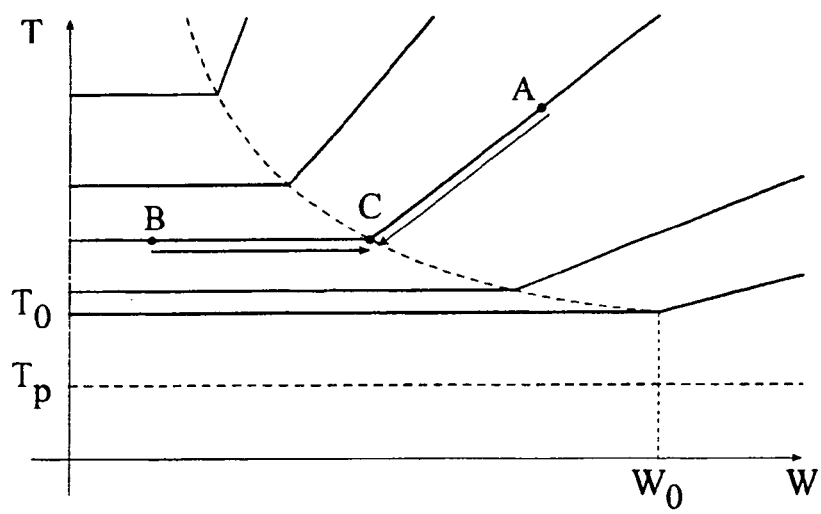

Obtained $\alpha$ is used to calculate optimal working point $(W_0(\alpha),T_0(\alpha))$ according to the FIG. 7. If the (W,T) point lies above the hyperbola, the transmitter has overloaded the network and it should reduce its packet sending rate. If the (W,T) point lies below the hyperbola, network is underutilized and packet sending rate should be increased. The packet emitting period $t_0(\alpha)$ is calculated from the optimal delay and window ratio, Equation 21:

$$t_0(\alpha) = \frac{T_0(\alpha)}{W_0(\alpha)} \text{ or } t_0(\alpha) = \frac{T_p + \frac{1}{\alpha}\frac{T_0}{W_0}}{T_p\alpha\frac{W_0}{T_0}+1} = \frac{1}{\alpha}\frac{T_0}{W_0} \qquad 21$$

If condition in Equation 18 is fulfilled, using Equation 19 we get Equation 22:

$$t_0(\alpha) = \frac{W_0 T}{W T_0}\frac{T_0}{W_0} = \frac{T}{W} \qquad 22$$

If condition in Equation 18 is not fulfilled, using Equation 20 we get Equation 23:

$$t_0(\alpha) = \frac{W_0(T-T_0)+T_0}{T_0}\frac{T_0}{W_0} = T - T_0 + \frac{T_0}{W_0} = T - T_0\frac{W_0-1}{W_0} = T - T_p \qquad 23$$

Equations 22 and 23 are simple and suitable for efficient implementation of the transmitter software. Besides optimal packet sending period we also calculate optimal window to ensure finite number of packets in the network, Equation 24:

$$W_0(\alpha) = T_0\frac{W_0-1}{W_0}\alpha\frac{W_0}{T_0} + 1 = (W_0-1)\alpha + 1 \qquad 24$$

If condition in Equation 18 is fulfilled, using Equation 19 we get Equation 25:

$$W_0(\alpha) = (W_0-1)\frac{WT_0}{W_0 T} + 1 = T_p\frac{W}{T} + 1 \qquad 25$$

If condition in Equation 18 is not fulfilled, using Equation 20 we get Equation 26:

$$W_0(\alpha) = (W_0-1)\frac{T_0}{W_0(T-T_0)+T_0} + 1 = \frac{W_0 T}{W_0(T-T_0)+T_0} = \frac{T_p}{T-T_p} + 1 \qquad 26$$

In praxis, formulas with $T_p$ from Equations 25 and 26 should be used for their simplicity.

Total Network Capacity Estimation

The total network capacity estimation is concerned with determination of the $(W_0,T_0)$ point coordinates. In reality, network is very complex structure and transmitter, using the black box approach, under the total network capacity in fact determines the capacity of the path used to transfer it's packets. In networks with virtual path (ATM, X.25) this path is always the same for the given connection. In networks without virtual channel (Internet) packets are forwarded individually, where it is observed that they follow the same forward path in great percentage, while acknowledgments follow different backward path.

The total capacity can be estimated using the measured parameters, or signaled from the network nodes. Estimation method is less precise, but does not require network nodes processing It appears to be more suitable for networks without virtual channels. Signaling method is more precise, but requires additional network nodes processing in the phase of connection establishment. It appears to be more suitable for networks using virtual channels. Alternatively, signaling method can be used in networks without virtual channel when network nodes signal total capacity for every packet forwarded.

With estimation method, measurements of round trip time T, window W and service time $T_s=1/\mu$ are available. Service rate $\mu$ is limited with the slowest channel on the path, the bottleneck channel. If minimal round trip time $T=T_0$ and serving time $T_s$ are measured, Equation 27 follows:

$$T_p = T_0 - T_s \text{ and } W_0 = \frac{T_0}{T_s} = T_0\mu \qquad 27$$

The measurement of parameters $T_p$ and $T_s$ can be difficult. We have supposed that minimal round trip time measured is equal to $T_0$. In real network there is no guarantee that measured minimal round trip time even approaches real $T_0$. Similar difficulties are present with serving time $T_s$ measurement. The packet pair method gives acceptable results on simple networks only, because there is no way to avoid the influence of phase effects from other users. Packets from a pair can be spread apart after the bottleneck channel.

With signaling method, we start from the assumption that packet forwarding path will not change, or that network with virtual channel is in question. Here we analyze channel parameters that one can obtain from the given node.

The channel is uniquely determined with its capacity $C_i(b/s)$ and propagation delay $T_{pi}$. The total propagation delay on the m-channel path is of interest for user, Equation 28:

$$T_{p0} = \sum_i T_{pi}; i = 1 \ldots m \qquad 28$$

and that value fully corresponds to the propagation time of the single server model.

Transmission (service) time is variable and in accordance to Equation 5 depends on channel capacity and mean length of the packet. Concerning that the same packets are forwarded along the path, the same packet length distribution can be observed on all segments, resulting that differences in transmission times depend only on individual channel capacities. Total service time on the path is, Equation 29:

$$T_{s0} = \sum_i T_{si}; \ i = 1 \ldots m \quad 29$$

However, a path consists of serial connection of channels, with optimal speed equal to the speed of the slowest channel. Here we use the bottleneck concept, Equation 30:

$$T_{sb} = \max_i(T_{si}); \ i = 1 \ldots m \quad 30$$

For the transmission time we use bottleneck serving time $T_{sb}$ according to Equation 30, while transmission times of other channels can simply be added to the propagation time, Equation 31:

$$T_0 = \sum_i T_{0i} = \sum_i T_{pi} + \sum_i T_{si} = \left( \sum_i T_{pi} + \sum_{i \neq b} T_{si} \right) + T_{sb} \quad 31$$

Using Equation 3 we get Equation 32:

$$T_p = \sum_i T_{pi} + \sum_{i \neq b} T_{si} = T_{p0} + \sum_{i \neq b} T_{si} \text{ and } T_s = T_{sb} \quad 32$$

To achieve efficient operation of network nodes, it is optimal to signal elementary channel parameters, that can be used at the transmitter to calculate needed values. Nodes can signal total propagation time by adding propagation times of their own channels to the value of appropriate cumulative variable in the packet header, Equation 33:

$$T_{p0} = \sum_i T_{pi} \quad 33$$

Concerning the transmission time depends on packet length M and channel capacity, it is convenient for a node to signal the channel capacity. Using Equation 5 for a single server model, we have Equation 34:

$$T_{s0} = \sum_i T_{si} = \sum_i \frac{\overline{M}}{C_i} = \overline{M} \sum_i \frac{1}{C_i} \quad 34$$

Network nodes should accumulate reciprocal values of channel capacity to another cumulative variable in the packet header. According Equation 31, we also need the bottleneck service time, which can be easily obtained by signaling the bottleneck capacity, Equation 35:

$$C_b = \min_i(C_i); \ i = 1 \cdots m \quad 35$$

A node will signal the bottleneck channel capacity by inserting to the packet header variable the capacity of its own channel only if it is lower than current value of the variable. Transmitter, knowing the mean length $\overline{M}$ of it's own packets, calculates transmission (service) time $T_s$, Equation 36:

$$T_s = \frac{\overline{M}}{C_b} \quad 36$$

and propagation time $T_p$, Equation 37:

$$T_p = \sum_i T_{pi} + \sum_i T_{si} - T_{sb} = T_{p0} + T_{s0} - T_s = T_{p0} + \overline{M} \left( \sum_i \frac{1}{C_i} - \frac{1}{C_b} \right) \quad 37$$

Minimal propagation time $T_0$ is calculated according to Equation 3, and window $W_0$ according to Equation 27.

Total Network Capacity Correction

At the beginning of operation, i.e. at the or immediately after the logical channel establishment, transmitter estimates initial values for $(W_0, T_0)$. Estimated parameters may not be correct. During the operation, transmitter can measure such a dot $(W,T)$, that does not correspond to the actual W,T plane, FIG. 8.

Figure 8:
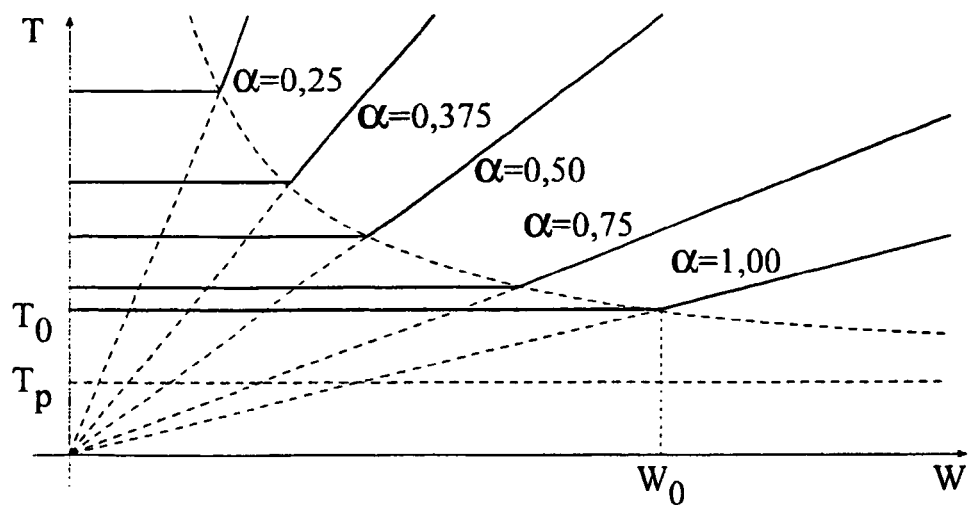

If parameters $(W_0, T_0)$ are estimated correctly, measured dot can not be located in the area defined with Equation 38:

$$T < \begin{cases} T_0 & W \leq W_0 \\ W \dfrac{T_0}{W_0} & W > W_0 \end{cases} \quad 38$$

on FIG. 8 under the delay curve, because $T_0$ is minimal serving time and $W_0$ is a window of packets needed to fill the channel and server.

Suppose, instead, that $(W_0, T_0)$ are incorrect in a way that real network capacity is greater than estimated. New network capacity point $(W'_0, T'_0)$ will be positioned in the part of W,T plane below the delay curve on FIG. 8. Two cases are possible, Equations 39 and 40:

$$T_p < T < \begin{cases} T_0 & W \leq W_0 \\ W \dfrac{T_0}{W_0} & W > W_0 \end{cases} \quad 39$$

$$T < T_p \quad 40$$

In the case of Equation 39, the $(W'_0, T'_0)$ point is located below the delay curve, but above the horizontal line $T_p$, FIG. 8. In that case, three possibilities of using earlier measurements are available, to assume that $T_p$ was correct, that $T_s$ was correct or that window $W_0$, i.e. ratio $T_0/T_s$, was correct.

$T_p$ correct assumption: We can assume that propagation time $T_p$ is estimated correctly, meaning that network (bottleneck) capacity is wrong. In the case of lower capacity, the effect is the same as the regular corresponding capacity fluctuations due to change in number of other data flows. In the case of capacity increase, new working point $(W'_0, T'_0)$ should be estimated. The assumed $T_p$ correctness implies that path is not changed, and the difference between old and new value of optimal delay, $T_0 - T'_0$, can according to Equation 3 appear because the lower service time $T_s$ only.

Here we use the property of curve $W_0(\alpha)$, Equation 11, that it extends to the area for $\alpha > 1$, or to the right in W,T plane where $W > W_0$, the fact that was not used before. According to FIG. 8, the curve is extended to the right of point $W_0$. Suppose a situation when, after using parameters ($W_0, T_0$), a new round trip time $T_p<T<T_0$ is measured. We take this value as the new minimal time:

$$T'_0 = T \qquad 41$$

It is necessary to determine new window $W'_0$. We start with Equation 17 and get Equation 42:

$$T_p = T_0 - \frac{T_0}{W_0} = T'_0 - \frac{T'_0}{W'_0} \qquad 42$$

resulting with Equation 43:

$$W'_0 = \frac{T'_0}{T'_0 - T_0 \frac{W_0 - 1}{W_0}} = \frac{T'_0 W_0}{T_0 - W_0(T_0 - T'_0)} = \frac{T'_0}{T'_0 - T_p} \qquad 43$$

Transmitter will constantly track difference between $T_0$ and T, and when needed adjust total network capacity parameters using Equations 42 and 43. Assumption that earlier value of $T_p$ was correct is very risky because of smooth hyperbola slope for $\alpha>1$. If $T_p$ parameter was incorrect, optimal window correction using Equation 43 gives unacceptably high values.

$T_s$ correct assumption: If we assume that transmission time $T_s$ is correct, we have badly estimated $T_p$ based on incorrect $T_0$. In that case we use new minimal value according to Equation 41, and modifying Equation 27 we get Equations 44 to calculate $T_p$ and $W_0$:

$$T_p = T'_0 - T_s, \quad W'_0 = \frac{T'_0}{T_s} \qquad 44$$

If correct $T_s$ assumption is only partly correct, Equations 44 give acceptable and stable results. New optimal window is lower than previous one.

$W_0 = T_0/T_s$ correct assumption: Here we assume that transmission and propagation times are evaluated with the same error. Based on the constant $W_0$ using new $T'_0$ and according to Equation 41 we calculate new service time, Equation 45:

$$T_s = \frac{T'_0}{W_0} \qquad 45$$

and propagation time using Equation 44. This method provides stable results, because it preserves old optimal window. It is somewhat more aggressive compared to constant $T_s$ method, which results with lower window, but is still far more stable than the correct $T_p$ method.

In the case of Equation 40, the ($W'_0, T'_0$) point is located below the horizontal line $T_p$, FIG. 8. Because of $T<T_p$, parameter $T_p$ is definitely not correct. We can suppose that major change in network operating mode happened, or that earlier estimation was completely wrong. As the consequence, we are aware that previous value of $W_0$, which should denote number of packets in the channel and in the server, in reality includes some packets in the waiting queue, Equation 46:

$$W_0 = W'_0 + W'_q \qquad 46$$

However, because $W'_q$ is unknown, we cannot simply determine $W'_0$. Here we can assume that such a drastic change in delay time has occurred without service rate decrease, Equation 47:

$$\frac{1}{\mu'} \leq \frac{1}{\mu} \Rightarrow \frac{T'_0}{W'_0} \leq \frac{T_0}{W_0} \qquad 47$$

and consequently, Equation 48:

$$W'_0 \geq \frac{T'_0}{T_0} W_0 \qquad 48$$

In the same time we have actual measurement of window W. If new, minimal delay was measured with window larger than the value of Equation 48, we take measured value for $W'_0$. Transmitter will operate using Equations 41 and 49:

$$W'_0 = \max\left(\frac{T'_0}{T_0} W_0, W\right) \qquad 49$$

WTFC Auxiliary Algorithms

From the transmitter point of view, we have three outside events that stimulate its activity:
1. Data to be sent, delivered from communications user
2. Acknowledgment, received from the network
3. Interpacket delay timer expiration.

We distinguish three phases in the flow control establishment:
1. First and further packets sending, but before first acknowledgment is received
2. After first acknowledgment, but before second one is received
3. After second acknowledgment is received.

Transmitter will send packet to the network primarily after the interpacket delay timer expiration. If optimal window has already been achieved at that window, packet sending is postponed until next acknowledgment is received. Interpacket delay timer expiration we recognize as a credit, and only one credit can be memorized. Transmitter operation using optimal rate $1/t_0(\alpha)$ with one credit provides packet emitting without bursts, while usage of optimal window $W_0(\alpha)$ criteria preserves finite number of packets in the network. This two parameters bring the network to the optimal working point.

Connection startup algorithm: In the first phase, transmitter has no knowledge about the network capacity. This phase lasts until the first acknowledgment is received, i.e. equals (initial) round trip time T. Depending on network structure, distance and routing, and network load, round trip time can be anywhere between 1 ms and more than 10 s, the ratio of values is 1:10000. In the same time, available bit rate can be in range from 15.000 to 15.000.000 b/s or more.

Networks are characterized with bandwidth-delay product $\chi \div CT$. When low transmission speed is in question, large delay is of no concern because small amount of data can be transferred during the single round trip time. The situation is very similar with high speed low delay networks. In both cases, bandwidth-delay product is relatively low. Problems arise with high speed high delay networks, when bandwidth-delay product is high. With such networks, transmitter inactivity of several hundred milliseconds results with resource utilization loss of tenths of megabits. Parameter $\chi$ exactly represents number of bits in channel at full utilization, but in the same time the number of not transferred bits in case of transmitter pausing during one round trip time.

It often happens that high χ network users need to transfer less than χ amount of data. That means that these data could be sent before the first round trip time period passes, only if transmitter should have known his relevant network capacity. On the other send, sending larger number of packets to the network in the first phase is questionable because working point of the network is not known.

Figure 9:
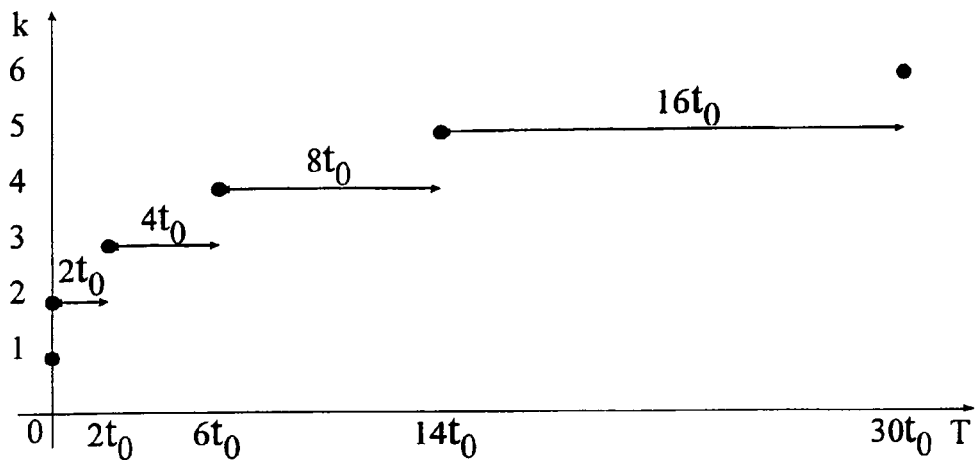

Here we use an algorithm that enables sending of moderate number of packets in the first phase, and still not to congest the low capacity network. If total capacity estimation is used, algorithm sends packet pair at the very beginning of the data transfer. Packets $p_1$ and $p_2$ are used to measure bottleneck capacity. If total capacity signaling is used, only on packet ($p_1$) is sent at the beginning of operation. After that, transmitter continues to send packets periodically with exponential slowdown. The time between two subsequent packets k and k+1, $t_k$, is of double duration compared the time before previous packets k−1 and k, Equation 50:

$$t_k = t_0 2^{k-1}; k \geq 2 \qquad 50$$

where $t_0$ is one half of the initial period. The graph of packet sending dynamics is presented on FIG. 9.

Figure 10:
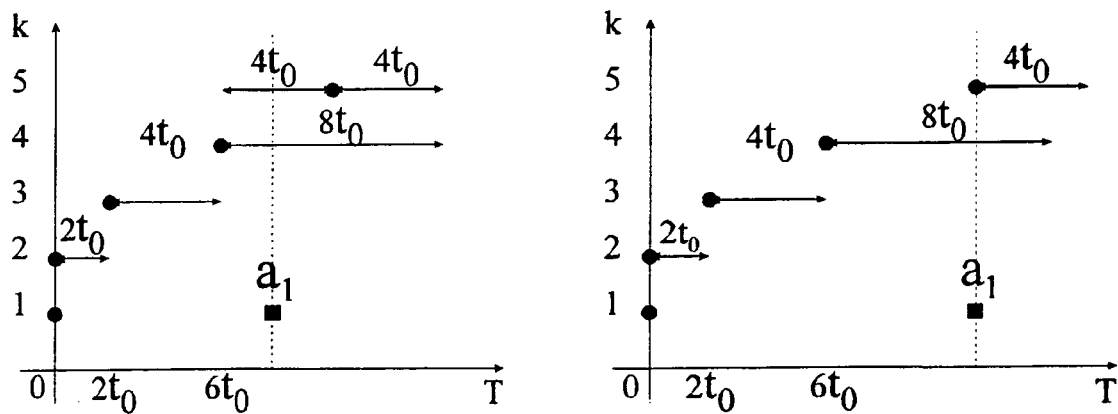

In the moment when first acknowledgment is received, the second phase begins. In this phase we wait for reception of second acknowledgment and we send packets using the achieved sending period $t_{k-1}$, FIG. 10. First acknowledgment reception can occur in the first half of the period $t_k=2t_{k-1}$, and we wait that half to expire to send the packet. Otherwise, if first acknowledgment is received in the second part of the period $t_k$, new packet is emitted immediately. In both cases, timer is initiated to $t_k$. This way, long waiting for $t_k$ expiration is avoided, and lower ambiguity about packet emitting moment after the first acknowledgment is achieved. Because of this algorithm, during the first phase timer is always initiated to half of the desired value, and initial packet sending period is $2t_0$. The same timer circuit can be used for startup as well as regular packet sending period determination.

Figure 11:
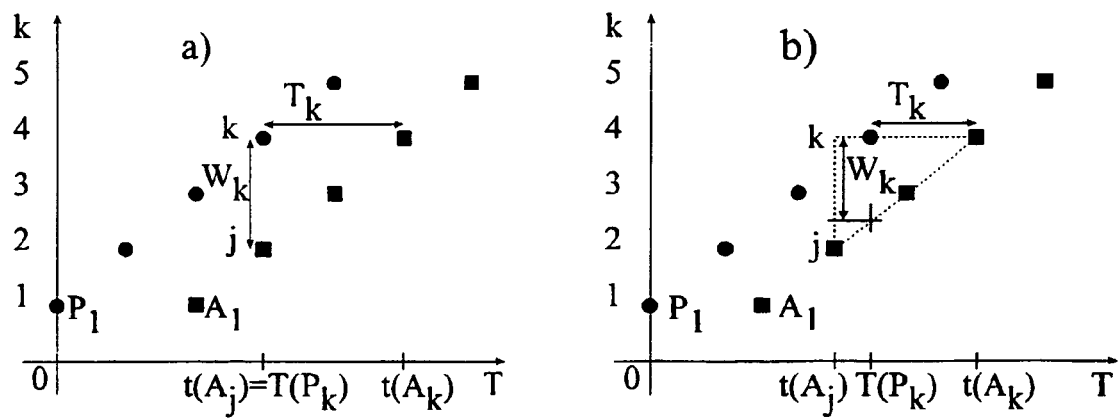

Measured window correction: The flow control algorithm calculates optimal working point using the measured pair (W,T), i.e. window and round trip time. Here, window is number of packets or octets in the network just at the moment when the packet, whose acknowledgment has just arrived and provided new (W,T) pair measurement, was emitted. With pure window control networks, new packet is sent at the moment when acknowledgment of some earlier packet was received. The window is an integer value, FIG. 11*a*.

With WTFC network packet is emitted at the moment of transmission period timer expiration, which is independent of acknowledgment reception (under condition that optimal window has not been filled yet). Considering that last acknowledgment was received before the current packet emission, we can assume that a part of packet on the network is already transferred. The integer window value is corrected taking round trip time into account, FIG. 11*b*. As we do not have exact information about the transferred data quantity, the linear approximation is used, Equation 51:

$$W_k = (k-j)\frac{t(A_k)-t(P_k)}{t(A_k)-t(A_j)} \qquad 51$$

where $t(A_k)$ and $t(A_j)$ are moments of observed packet acknowledgment reception and of last acknowledgment reception, before observed packet emission took place. $t(P_k)$ is the moment of observed packet emission. For $t(P_k)=t(A_j)$ Equation 51 is reduced to $W_k=(k-j)$, and is identical to Equation 2.

Corresponding capacity estimation algorithm: After second acknowledgment, a third phase of transmitter operation begins. We now have the total network capacity parameters $(W_0,T_0)$, and we are able to establish flow control. In this phase, the most important event is acknowledgment reception. In that moment we have new (W,T) pair, suitable to calculate packet sending period $t_0(\alpha)$ and optimal window $W_0(\alpha)$.

In praxis, parameter $t_0(\alpha)$ according Equation 22 should be used with care. The actual measurements of round trip time and window (W,T) are in fact data from the past. Parameter $t_0(\alpha)$ should be used to obtain optimal window in the future. Therefore, in real WTFC device the optimal window $W_0(\alpha)$ is calculated first, and than working value $t'_0(\alpha)$ using Equation 52:

$$t'_0(\alpha) = \frac{T}{W_0(\alpha)} \qquad 52$$

Parameter filtering: Feedback system stability depends significantly upon delay. The network response to any transmitter action will be noticeable only after the round trip time. Therefore, two adaptive filters are used, depending on round trip time and window size: rate slowdown and rate period $t'_0(\alpha)$ filtering.

Rate slowdown is used because WTFC model, based on D/D/1/W system, actually approximates real G/G/1 model. Real working point should be positioned to the left and above of the W,T plane curve break point. Packet sending rate slowdown is achieved using empirical relation, Equation 53:

$$t''_0(\alpha) = t'_0(\alpha)(1+\gamma T_0) \qquad 53$$

so when e.g. γ=0,1 and $T_0$=1s about 10% of rate reduction is achieved. With low round trip times, good system stability is expected, and operation near the full network utilization is possible. With longer delays, rate slowdown improves stability of operation.

Period $t''_0(\alpha)$, achieved using Equation 53, is additionally filtered using exponential smoothing, nonlinear regarding the direction of value change. If new rate is lower than previous, filtering is skipped, and new, larger value of $t''_0(\alpha)$ is effective immediately. When rate is increased, the adaptive filter dependent on window size is used, Equation 54:

$$t'''_0(\alpha)_k = \begin{cases} \beta t'''_0(\alpha)_{k-1} + (1-\beta)t''_0(\alpha)_k \\ t''_0(\alpha) \end{cases} \qquad 54$$

where factor $\beta$ is forgetting factor dependent on window $W_0(\alpha)$, Equation 55:

$$\beta = \begin{cases} 0 & W_0(\alpha) \leq a \\ \dfrac{W_0(\alpha) - a}{b} c & a < W_0(\alpha) \leq b \\ c & b < W_0(\alpha) \end{cases} \quad 55$$

Changing the values of a and b, the area of linear increase of $\beta$ with $W_0(\alpha)$ is changed. Changing the value of c, the slope of linear dependence is changed, and that is also the biggest filtering factor, achieved with large windows. Useful filtering parameters are e.g. a=0, b=10 and c=0,925.

Devices with Window-Time Space Flow Control

Packet switched data communications networks with window-time-space flow control (WTFC) are constructed using two basic types of equipment, WTFC nodes and WTFC terminals. Nodes generally forward packets, and are often called routers. Terminals are devices that allow users to access the network, and most frequently are user computers. Disregard the actual device construction and purpose, the important issue is that nodes and terminals perform the WTFC algorithms.

To implement WTFC mechanisms, besides the well known packet and acknowledgment numbers, packet number must contain additional variables according the Table 1. In packet header we have dual variables of each kind, to enable acknowledgment transfer inside the backward packets.

TABLE 1

Packet header variables needed for WTFC implementation

| variable name: | forward | backward |
|---|---|---|
| propagation time cumulative variable | $T_{pOf}$ | $T_{pOb}$ |
| reciprocal capacity value cumulative variable | $S_{Cif}$ | $S_{Cib}$ |
| reciprocal minimal channel capacity variable | $C_{iminf}$ | $C_{iminb}$ |
| last acknowledgment variable | $a_{jf}$ | $a_{jb}$ |
| sending time variable | $T(p_k)_f$ | $T(p_k)_b$ |

Figure 1:
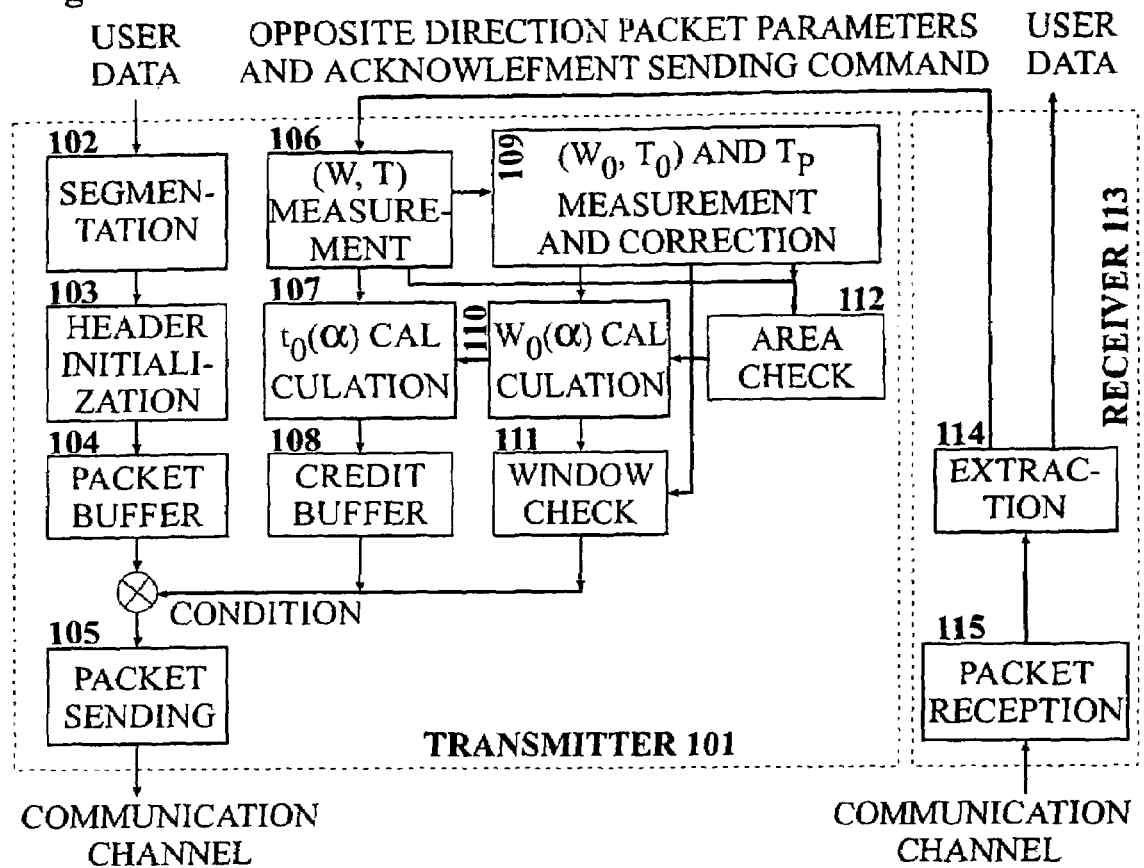
FIGS. 1–11 are used in detailed description of the invention to achieve easier invention understanding.

Terminals with WTFC control include two essential modules, the transmitter and receiver of packets or other user data units processed with WTFC FIG. 1.

Packet transmitter (101) forms packets dividing user data in segmentation process (102), or when no user data are pending for transmission, forms acknowledgment packets after the packet from the opposite direction is received, based on the receiver request.

Initialization process (103) writes appropriate values to the packet header variables. Forward last acknowledgment variable $a_{jf}$ is set to the value of last acknowledgment number received, and backward last acknowledgment variable $a_{jb}$ is set to the value of the same forward variable, received in the opposite direction packet whose acknowledgment number is contained in the current packet. Forward sending time variable $T(p_k)_f$ is set to the value of current local time, and backward sending time variable $T(p_k)_b$ is set to the value of the same forward variable, received in the opposite direction packet whose acknowledgment number is contained in the current packet. If network is signaling total capacity, forward propagation time cumulative variable $T_{pOf}$ and forward reciprocal capacity value cumulative variable $S_{cif}$ are cleared, and reciprocal minimal channel capacity variable $C_{iminf}$ is set to maximal value. In the same time, values from variables $T_{pOf}$, $S_{Cif}$ i $C_{iminf}$ received in the header of the opposite direction packet, are copied to the same backward variables of the current packet. Formed packets are stored in the packet buffer (104) and sent to the packet sending process (105) in accordance with credit in credit buffer (108) from transmission rate $t_0'''(\alpha)$ calculation process (107) and optimal window check (111) of $W_0(\alpha)$, if current window is lower than optimal.

$W_0(\alpha)$ calculation process (110) uses Equations 25 and 26 to calculate it, and $t_0'''(\alpha)$ calculation process (107) works according to Equations 52 and 23, or 53 and 54, both using condition from Equation 18 from the area check process (112).

After each acknowledgment reception, receiver signals to transmitter the acknowledgment number and time of acknowledgment, along with values stored in header variables listed in Table 1. Using these parameters, the (W,T) point measurement process (106) calculates particular values for T using Equation 1 an W using Equation 2, together with correction according the Equation 51.

On every or some of acknowledgments received, depending on method applied, the network total capacity estimation and correction process (109) calculates parameters ($W_0$,$T_0$), and $T_p$ using Equations 27 through 49.

Packet receiver (113) uses it's reception process (115) to receive packets from the channel and it's extraction process (114) to extract and deliver received data to the user, and needed header parameters and time of acknowledgment to the transmitter. In the same time, it sends an order to the transmitter to send acknowledgment included in the opposite direction packet header, or using separate acknowledgment packet if currently there are no user data to be sent.

Figure 2:
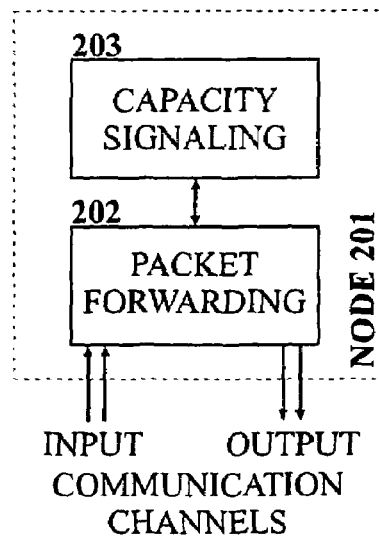

Nodes (201) forward packets using forwarding process (202), and in the same time, on the WTFC networks, can signal total capacity parameters if signaling method is used, FIG. 2. In that case, capacity signaling process (203) modifies forwarded packet header, updating the forward propagation time cumulative variable $T_{pOf}$ using Equation 33, forward reciprocal capacity value cumulative variable $S_{cif}$ according Equation 34 and forward reciprocal minimal channel capacity variable $C_{iminf}$ using Equation 35.

INVENTION REALIZATION AND APPLICATION

Considering that modern terminals and nodes are realized using computer technology, invention can be realized by embedding described algorithms to the device software. Chapter 4.8. of the invention essence exposition is also the description of the invention realization.

The invention can be applied by building data communications networks using devices with WTFC algorithms.

What is claimed is:

1. Packet switching data communications network with closed loop implicit feedback flow control comprising a Window-Time-Space Flow Control, WTFC, where a determined single server queuing system model with a finite number of packets and known value of a total network capacity point $W_0$,$T_0$ of a total network window $W_0$, a total serving time $T_0$ and an aggregated propagation time $T_p$ define a window-time plane of a packet window W and a delay time T, for determining a hyperbola through said network capacity point $W_0$,$T_0$ and a set of network response curves each for a fraction of total network capacity $\alpha$, said hyperbola and said curves contained in said window-time plane, wherein each said response curve is determined with a break point lying on said hyperbola through said network capacity point $W_0$,$T_0$, and a current W,T point measurement, wherein said window-time plane is used to determine whether a W,T point is positioned above or below said hyperbola, and to calculate optimal value of said capacity fraction cc and said break point of the current response curve, wherein said break point is used to calculate an optimal window $W_0(\alpha)$, an optimal delay time $T_0(\alpha)$, and an optimal packet sending period $t'''(\alpha)$;

a terminal that uses said window-time plane and said W,T point measurement to obtain said optimal packet sending period and said optimal window, and is constructed using a packet receiver (113) and a packet transmitter (101) of packets or other data units;

a node (201) that may signal said total network capacity $W_0, T_0$ by updating a set of elementary network channel parameters in packet headers, wherein said network parameters are a cumulative propagation time $T_{p0}$, a cumulative reciprocal capacity and a minimal channel capacity $C_b$.

2. Network of claim 1 wherein said packet transmitter (101) comprises a header initialization process (103).

3. Network of claim 2 wherein said header initialization process (103) performs initialization of packet header variables to:
set a forward last acknowledgment variable $a_{jf}$ to the value of a last acknowledgment sequence number received,
set a backward last acknowledgment variable $a_{jb}$ to the value of a forward last acknowledgment variable received in packet from the opposite direction, whose acknowledgment number is carried by a new packet,
set a forward transmission time variable $T(p_k)_f$ to actual local time,
set a backward transmission time variable $T(p_k)_b$ to the forward value of said transmission time variable received in packet from the opposite direction, whose acknowledgment number is carried by a new packet.

4. Network of claim 2 wherein said header initialization process (103) performs, when said total network capacity signaling is used, initialization of packet header variables to:
set a forward cumulative propagation time variable $T_{p0f}$ to zero;
set a forward cumulative reciprocal capacity variable $S_{cif}$ to zero;
set a forward minimal channel capacity variable $C_{iminf}$ to the maximal value;
copy values from said forward variables $T_{p0f}, S_{cif}$, and $C_{iminf}$ received in the opposite direction packet to backward variables $T_{p0b}, S_{Cib}$, and $C_{iminb}$ respectively.

5. Network of claim 1 wherein said packet transmitter (101) further comprises:
an area check process (112) to check the position said measured point W,T relative to said hyperbola by inspecting a condition formula $(W-1)/(W_0-1) \geq T_0/((T-T_0)W_0+T_0)$, a $W_0(\alpha)$ calculation process (110) to calculate said optimal window $W_0(\alpha)$ using
$W_0(\alpha)=T_p \cdot W/T+1$ if said condition formula is satisfied and
$W_0(\alpha)=T_p/(T-T_p)+1$ if said condition formula is not satisfied, a $t_0'''(\alpha)$ calculation process (107) to calculate said optimal packet sending period $t_0'''(\alpha)$ using $t'_0(\alpha)=T/W_0(\alpha)$, $t''_0(\alpha)=t'_0(\alpha)(1+\gamma T_0)$ and $$t'''_0(\alpha)_k = \begin{cases} \beta t''_0(\alpha)_{k-1} + (1-\beta)t''_0(\alpha)_k \\ t''_0(\alpha) \end{cases}$$

wherein $\beta$ and $\gamma$ are filtering parameters.

6. Network of claim 1 wherein said packet transmitter (101) performs
packet sending, when two conditions are both satisfied:
said optimal packet sending period $t'''(\alpha)$ expires and said optimal window $W_0(\alpha)$ is not filled,
a check of said optimal packet sending period $t_0'''(\alpha)$ expiration, in a $t_0'''(\alpha)$ calculation process (107) with a one credit buffer (108),
a check of said optimal window $W_0(\alpha)$ not being filled in a process of window check (111) that verifies whether the current window is less than said optimal window $W_0(\alpha)$.

7. Network of claim 6 wherein $t_0'''(\alpha)$ calculation process (107) further comprises:
a connection startup algorithm for smooth packet sending, that acts upon expiration of a time period initialized, and
before first acknowledgment reception, and if there is no credit stored in said credit buffer, sets said credit buffer to 1 and reinitiates the same value of said time period,
before first acknowledgment reception, and if there is credit stored in said credit buffer, initiates double value of said time period and initiates packet emitting,
after first acknowledgment reception, sets said credit buffer to 1 and initiates packet emitting.

8. Network of claim 1 wherein parameters are provided by said packet receiver (113) to said packet transmitter (101) after acknowledgment reception, said packet transmitter (101) further comprises:
a W,T point measurement process (106) adapted to use a transmission time of the packet k $t(P_k)$ and an acknowledgement time of a packet k $t(A_k)$ in formula $T=t(A_k)-t(P_k)$, and a last packet sequence number $P_k$ and a last acknowledgment sequence number $A_j$ in formula $W=P_k-A_j$ and to use a window correction formula $W_k=(k-j)\ (t(A_k)-t(P_k))/(t(A_k)-t(A_j))$ to obtain corrected value for window W;
a total capacity estimation and correction process (109) adapted to calculate and correct said total network capacity point $W_0, T_0$ and said aggregated propagation time $T_p$.

9. Network of claim 8 wherein said total capacity estimation and correction process (109) performs, when said total network capacity signaling is used:
a calculation of said aggregated propagation time $T_p$ by $$T_p = \sum_i T_{pi} + \sum_i T_{si} - T_{sb} = T_{p0} + \overline{M}\left(\sum_i 1/C_i - 1/C_b\right)$$

where M stands for average packet length,
a calculation of said total serving time $T_0$ by $T_0=T_s+T_p$ where $T_s$ stands for service time available from the said minimal channel capacity,
a calculation of said total network window $W_0$ by $W_0=T_0/T_s$, using extracted parameters from first or every packet received from the opposite direction.

10. Network of claim 8 wherein said total capacity estimation and correction process (109) performs,
when said total network capacity signaling is not used,
a calculation of said total serving time $T_0$ using $T_0=T$ after a first acknowledgment is received,
a calculation of said total network window $W_0$ using $W_0=T_0(T-T_0)$ after a second acknowledgment is received,
using extracted parameters from every packet received from the opposite direction.

11. Network of claim 8 wherein said total capacity estimation and correction process (109) performs, when said total network capacity signaling is not used, if measured $T<T_0$:
a correction of said total serving time $T_0$ using minimal measured value of said delay time T, $T_0=\min(T)$,
a correction of said total network window $W_0$ using $W'_0=\max((T'_0/T_0)W_0, W)$ if $T<T_p$, otherwise using $W'_0=T'_0/(T'_0-T_p)$ and $W'_0=T_0/T_S$, where $W_0'$ and $T_0'$ stand for corrected values,
a correction of said aggregated propagation time $T_p$ using $T_p=T_0(W_0-1)/W_0$,
by using measured parameters from every packet received from the opposite direction.

12. Network of claim 1 wherein said packet receiver (113) comprises
an extraction process (114) adapted to extract said cumulative propagation time from a backward cumulative propagation time variable $T_{p0b}$, said cumulative reciprocal capacity from a backward cumulative reciprocal capacity variable $S_{cib}$, said minimal channel capacity from a backward minimal channel capacity variable $C_{iminb}$, a last acknowledgment sequence number from a packet header and a transmission time from a backward transmission time variable $T(p_k)_b$ or from a local record, and to deliver said extracted parameters to the packet transmitter (101).

13. Network of claim 1 wherein the node (201) is adapted to forward packets with forwarding process (202) and further comprises, when said total network capacity signaling is used, a capacity signaling process (203).

14. Network of claim 13 wherein said capacity signaling process (203) performs
an updating of a forward cumulative propagation time variable $T_{p0f}$ of a first or every packet using $$T_{p0} = \sum_i T_{pi},$$

an updating of a forward cumulative reciprocal capacity variable $S_{cif}$ of a first or every packet using $$T_{s0} = \overline{M} \sum_i 1/C_i,$$

an updating of a forward minimal channel capacity variable $C_{nminf}$ of a first or every packet using $$C_b = \min_i(C_i).$$

* * * * *